United States Patent [19]

Le Bastard

[11] Patent Number: 5,418,840
[45] Date of Patent: May 23, 1995

[54] DEVICE AND METHOD FOR TELEPHONE INTERCONNECTIONS FOR A COMMUNICATIONS NETWORK WITH INDEPENDENT STATIONS

[75] Inventor: Jean Le Bastard, Le Chesnay, France

[73] Assignee: Dassault Electronique, Saint-Cloud, France

[21] Appl. No.: 132,690

[22] Filed: Oct. 7, 1993

Related U.S. Application Data

[63] Continuation of Ser. No. 696,348, May 6, 1991, abandoned.

[30] Foreign Application Priority Data

May 9, 1990 [FR] France ................. 90 05792

[51] Int. Cl.6 ............................................. H04M 11/00
[52] U.S. Cl. ................................... 379/63; 379/58
[58] Field of Search ................ 379/58, 59, 61, 63, 379/60, 62; 455/33.1, 33.2, 56.1

[56] References Cited

U.S. PATENT DOCUMENTS

| | | | |
|---|---|---|---|
| 4,268,722 | 5/1981 | Little et al. | 379/59 X |
| 4,670,899 | 6/1987 | Brody et al. | 379/59 |
| 5,020,090 | 5/1991 | Morris | 379/58 |
| 5,090,050 | 2/1992 | Heffernan | 379/60 |
| 5,090,051 | 2/1992 | Muppidi et al. | 379/61 |

FOREIGN PATENT DOCUMENTS

| | | |
|---|---|---|
| 0212761 | 3/1987 | European Pat. Off. . |
| 61-177830 | 8/1986 | Japan . |
| 0177830 | 8/1986 | Japan . |
| 2193861 | 2/1988 | United Kingdom . |

*Primary Examiner*—Curtis Kuntz
*Assistant Examiner*—G. J. Oehling
*Attorney, Agent, or Firm*—Christie, Parker & Hale

[57] ABSTRACT

A specific module of a communications network comprises (i) first and second telephone interface mechanisms respectively connected to telephone channels, (ii) interconnection mechanisms between these first and second interfaces, and (iii) a processing mechanism. In response to a request for a telephone call from a telephone set calling a call (dialing) number assigned to a portable handset, the call request being received at one of the first interfaces, an attempt is made to establish, in addition to the first telephone connection from the calling set to said first telephone interface, a second telephone connection from the portable handset to one of the second telephone interfaces in accordance with predetermined conditions, and the interconnection of the first and second interfaces concerned is obtained.

24 Claims, 6 Drawing Sheets

DEVICE AND METHOD FOR TELEPHONE INTERCONNECTIONS FOR A COMMUNICATIONS NETWORK WITH INDEPENDENT STATIONS

CROSS-REFERENCE TO RELATED APPLICATION

This is a continuation of application Ser. No. 07/696,348, filed May 6, 1991, now abandoned.

FIELD OF THE INVENTION

The present invention concerns telephony.

This invention is more particularly intended to serve in a communications network between fixed stations, such as telephone sets and fixed terminals capable of mutual cooperation over distances with independent stations, such as portable telephone handsets, in response to requests for calls from the latter.

Such a network is, for example, that known in France under the trademark of POINTEL and the invention finds a particularly advantageous but not restricted application therein.

PRIOR ART

The POINTEL network has so far been intended to permit the management of telephone calls coming from independent handsets to the destination of telephone sets connected, for example, to the public switching telephone network. Such calls are termed "outgoing calls".

At present it is not possible to effect and manage "incoming" calls, that is to say, calls coming in particular from telephone sets connected to the public switching telephone network, intended for the independent handsets.

It is an object of the present invention to provide a solution to this problem.

SUMMARY OF THE INVENTION

According to a general characteristic of the invention, the telephone device intended to serve in a communications network of the type set out above comprises at least one specific module comprising:
- first and second telephone interfaces respectively connected to the telephone channels of the network,
- interconnection means between these first and second interfaces,
- processing means capable of responding to a request for a telephone call from a station calling a call number assigned to a callable independent station, the call request being received at one of the first interfaces:
  - by (i) trying to establish, in addition to the first telephone connection from the calling station to the first interface, a second telephone connection from the independent station to one of the second interfaces in accordance with predetermined conditions, and
  - by (ii) obtaining the interconnection of the first and second interfaces concerned.

These predetermined conditions may comprise, for example, a check that a subscriber of the independent station is actually present and ready to accept the telephone call.

In one embodiment, the establishment of the second telephone connection comprises the establishment of a telephone link between (a) the second interface concerned and (b) a chosen fixed terminal capable of cooperating with the callable independent station. In this case, the predetermined conditions may also comprise a check of the effective capability of the chosen terminal to cooperate with the independent station.

In this embodiment, the establishment of the telephone link is produced by a telephone call from the said chosen terminal to the specific module.

When the communications network is, moreover, provided with a digital communications medium, the specific module then comprises digital interface means connected to the medium and, with a view to establishing the second telephone connection, the processing means are then advantageously capable of establishing a digital connection in the medium between the digital interface means and the chosen terminal, this link being established before that of the telephone connection on the telephone channels. This digital link may comprise the transmission of a digital signal from the specific module to the chosen terminal.

Very advantageously provision is made for means forming a data base connected to the processing means of the specific module and capable of storing, in conformity with the call number of the independent station, data for localizing the chosen terminal, for allowing the telephone link to be established.

This localization data may derive from a localization dialogue between the callable independent station and the chosen terminal. This localization dialogue may comprise transmission of a localization signal from the callable independent station to the chosen terminal. As a variant, it may also comprise a prior telephone communication between the independent station and the chosen terminal.

When two localization data of different types are available, deriving in particular from two localization dialogues of different types and relating to different chosen terminals, it is particularly advantageous for the means forming the data bases to be capable of storing these two localization data.

In one embodiment of the invention, the localization data is formed by digital type information allowing the digital connection to be established. In this case, when the device comprises units for the connection of fixed terminals, each connection unit being on the one hand connected to a group of fixed terminals, and on the other hand, at least to the digital communication medium of the network, the localization data then comprises the digital identification of the connection unit connected to the chosen terminal, as well as the designation of the chosen terminal within the group of terminals controlled by this connection unit.

According to another aspect of the invention, in case the predetermined conditions relating to the chosen terminal are not met, the device is then advantageously capable of trying to establish the telephone connection with at least one other terminal chosen from the terminals adjacent to the chosen terminal.

A call number of an independent station is generally associated with its usual line location; the device in accordance with the invention may then comprise a plurality of specific modules respectively assigned to a plurality of adjacent line locations.

It is then possible for the means forming the data base to be distributed into local data bases associated with each specific module and having available data for localizing chosen terminals in relation to their usual independent stations. However, provision may also be made for these means forming the data bases to be centralized, each specific module then having access to the centralized data base.

Provision is also made for the device in accordance with the invention to be capable of connection both to a public switching network, and to a private switching network.

The present invention also provides a method for telephone interconnections, intended to serve in a communications network between fixed stations and fixed terminals capable of mutual cooperation over distances with independent stations in response to call requests from the latter, characterized in that provision is made for at least one specific module comprising:

first and second telephone interfaces respectively connected to the telephone channels of the network, interconnection means between these first and second interfaces, processing means capable of responding to a request for a telephone call from a station calling a call number assigned to a callable independent station, the call request being received at one of the first interfaces and, and in that, in response to such a request for a telephone call:

one tries to establish, in addition to the first telephone connection from the calling station to the first interface, a second telephone connection from the independent station to one of the second interfaces in accordance with predetermined conditions, and one obtains the interconnection of the first and second interfaces concerned.

BRIEF DESCRIPTION OF THE DRAWINGS

Other objects and advantages of the invention will emerge on an examination of the detailed description given below, and of the attached drawings wherein.

DETAILED DESCRIPTION OF THE PREFERRED EMBODIMENT

The drawings comprise in essence elements of a definitive nature. On this basis, they can serve not only to provide a better understanding of the detailed description given below, but they can also contribute to the definition of the invention, if required.

Figure 1:
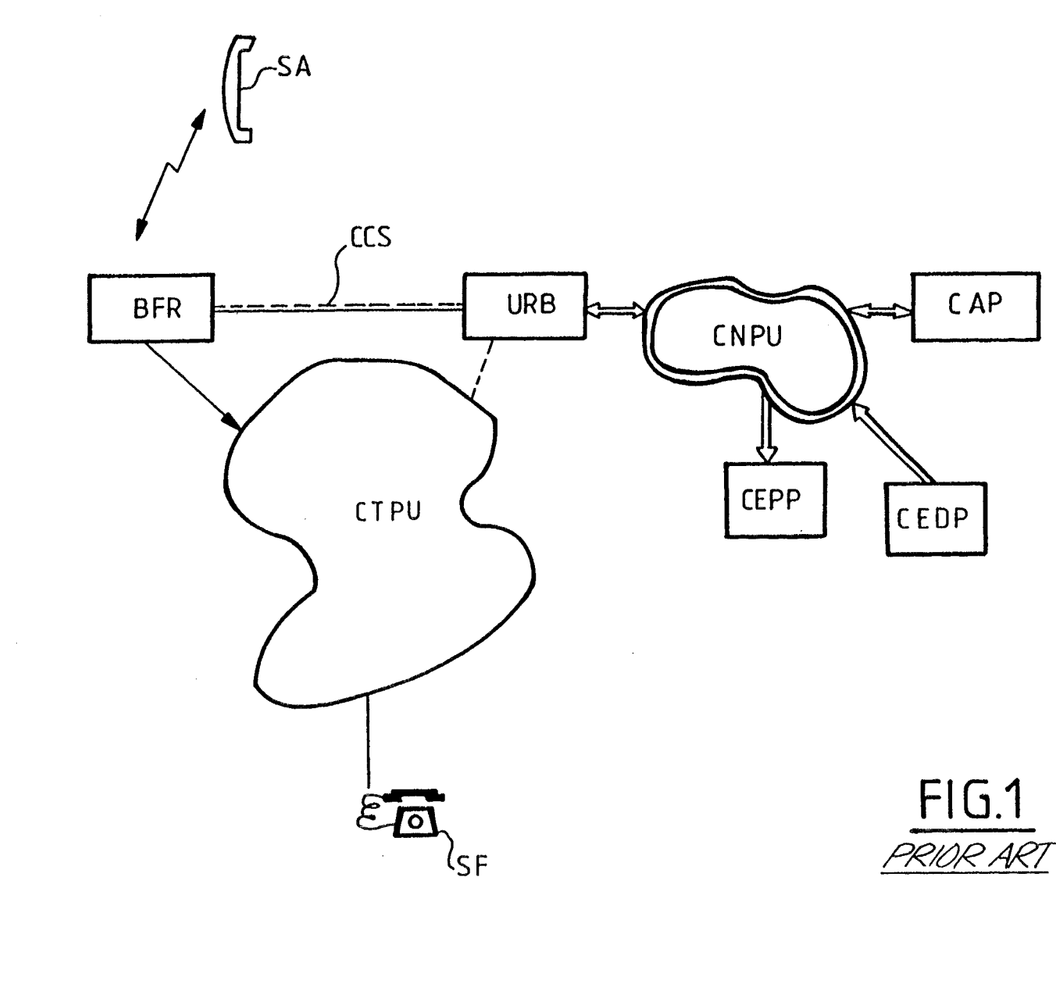
FIG. 1 represents a block diagram of the prior art POINTEL type communications network.

It will now be assumed that the invention applies to the POINTEL network, whose present structure will now be very briefly described with reference to FIG. 1.

Independent stations SA, such as portable telephone handsets, are capable of mutual cooperation over distances via radio channels with fixed radio terminals BFR. The radio exchanges between the independent stations and the terminals are governed by a British Standard termed "CAI" (Common Air Interface). The exchanges are effected by way of frequency modulation based on a frequency band by radio communication, this frequency band usually allowing one channel to be established for the voice exchange and one channel for the exchange of digital data.

These fixed terminals BFR are connected to the terminal connection units URB via a special control channel CCS. Each terminal connection unit thus controls a group of fixed terminals BFR.

A fixed terminal can be directly connected to the telephone channels CTPU of the public switching telephone network. In this case, the URB unit controlling it is not connected to these telephone channels.

It is possible for a fixed terminal not to be directly connected to the telephone channels CTPU. In this case, its connection is effected via its connection unit which is then directly connected to the CTPU channels.

Each fixed terminal BFR can only transmit telephone calls to the telephone channels CTPU, but it can, of course transmit or receive radio calls to the destination of, or coming from, independent stations SA.

The communications network comprises, in addition to the telephone channels CTPU, a digital data communication medium CNPU operating in principle by way of packets, such as the TRANSPAC network (trademark). In the text below, the expression "communication medium" will be replaced by the term "channel" for the sake of uniformity, although the expert will then know that the meaning of the term channel may not be the same, as in the case of telephone channels.

To these digital signalling channels CNPU, there are connected the various URB units, as well as other constituents of the POINTEL network designated with the references CAP, CEPP and CEDP.

The POINTEL authorization center CAP controls the subscriptions for the whole POINTEL network, and hence the authorizations enabling the POINTEL users to call a fixed station SF connected to the telephone channels CTPU from an independent station. For this purpose, the terminal connection units URB are connected to the CAP center via digital channels CNPU.

The connection units URB are also connected to the main POINTEL operating center CEPP via digital channels CNPU, for the purpose of transferring the data relating to the telephone communications exchanged, to enable the CEPP center to transmit these data to an invoicing system.

The decentralized POINTEL operating centers CEDP are control units intended to supervise the operation of the network on a regional basis and to detect, in particular, anomalies in the functioning of the connection units URB and/or of the fixed terminals BFR.

It should be noted that the CEDP centers can communicate data to the CEPP center via digital channels for national monitoring purposes.

When an independent station SA wishes to call a fixed station SF, the fixed terminal BFR concerned can be directly connected to the public switching telephone network or via a connecting unit URB controlling it, according to the connection configuration of the adopted network.

As has already been set out above, it is not possible to establish incoming calls with such a network configuration.

Hence the main object of the invention is to remedy this defect.

For this purpose, provision is made in general for at least one specific module comprising:
- first and second telephone interfaces respectively connected to the telephone channels of the network,
- interconnection means between these first and second interfaces, and
- processing means capable of responding to a request for a telephone call from a calling station to a call number assigned to a callable independent station, this call request being received at one of the first interfaces.

In response to such a request, one then tries to establish, in addition to the first telephone connection from the calling station to the first interface of the specific module, a second telephone connection from the independent station to one of the second interfaces of the specific module in accordance with predetermined conditions, and
- one obtains the interconnection of the first and second interfaces concerned.

Figure 2:
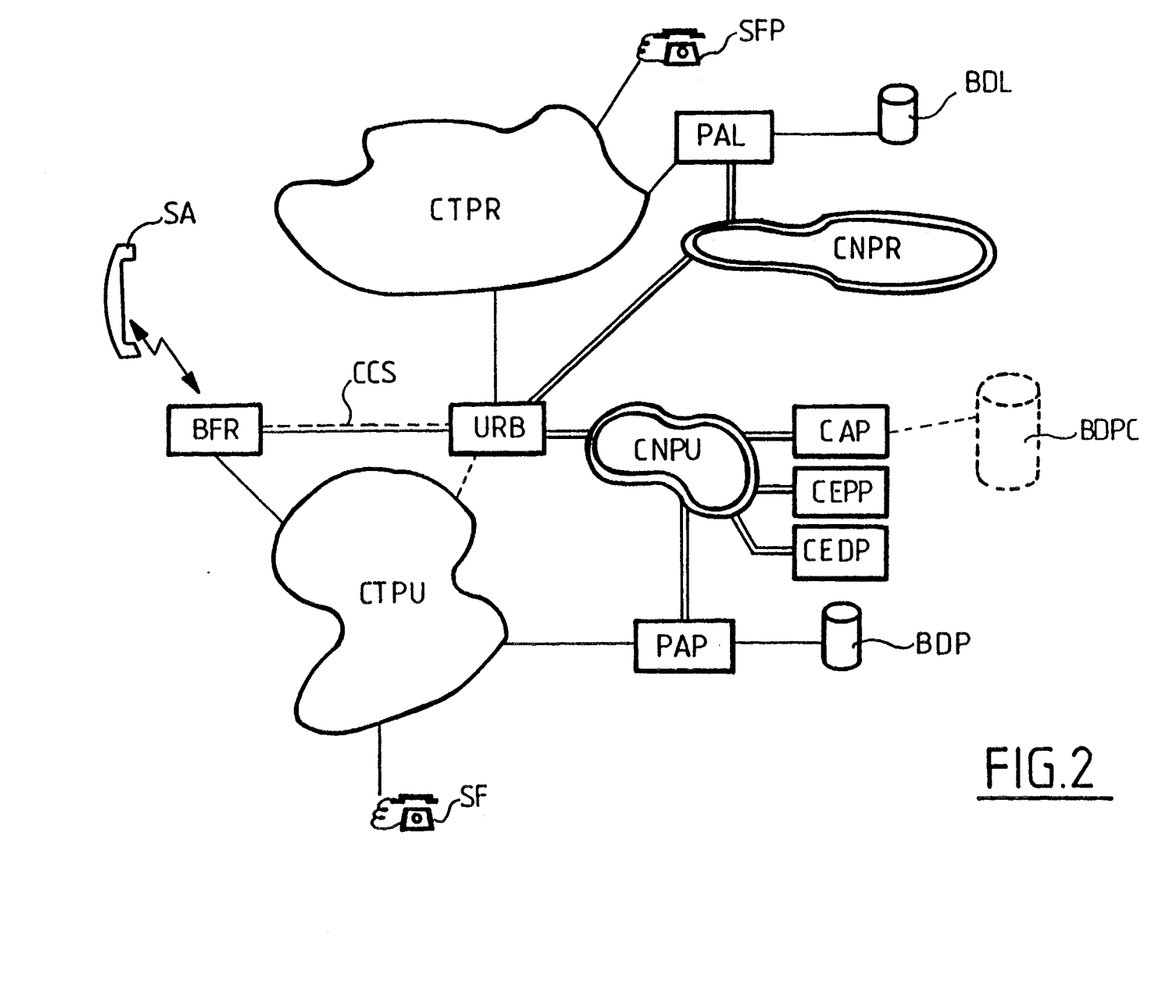
FIG. 2 represents a block diagram of a public and private communications network provided with means in accordance with the invention.

If reference is made to FIG. 2, it will be seen that the specific module PAP is connected to the telephone channels CTPU and to the digital channels CNPU of the public communications network. It is, moreover, associated with a data base BDP which will be discussed in greater detail in the contents below.

The terminal connecting units URB also allow the switching to private switching networks also comprising private telephone channels CTPR as well as private digital communication channels CNPR. In this case, the invention makes provision for the specific modules, designated this time with the reference PAL, to be capable of incorporation in the private switching network in association with a data base BDL, with a view to allowing incoming calls to an independent handset SA coming, for example, from a telephone set SFP of the private network.

There will now be discussed more particularly the establishment of an incoming call from a fixed station SF connected to the public switching telephone network CTPU to a subscriber having an independent handset SA.

Each callable independent station SA is assigned a call number associated with its identifying individual and with its usual line location. Provision is then made for the device to comprise a plurality of specific modules assigned respectively to line sectors possibly covering a plurality of adjacent line locations. For the sake of simplification, FIG. 2 illustrates a single specific module PAP assigned to one line sector.

To make it possible for the independent handset SA to be called at any geographical location, it is necessary that it can be located in relation to a chosen fixed terminal. This localization data is stored in the means forming the data base BDP associated with each specific module PAP. This data base BDP comprises, apart from the data localizing the chosen fixed terminal BFR and hence the independent station SA, the relation between the call number of this handset SA and its identifying individual.

This localization data derives from a localization dialogue between the independent station SA and the chosen terminal BFR. It could be envisaged that the localization dialogue should be effected on a time base at regular intervals, so that localization information of the independent station is permanently available over the whole network. However, since the radio cover of each fixed terminal BFR is of the order of some tens to some hundreds of meters, such a localization procedure would at the present state lead, if not to a saturation of the telephone network, at least to a very high number of localization data which would lead to an unduly onerous handling.

Thus, the principle of voluntary localization on the part of a subscriber wishing to receive telephone calls on his independent handset is presently preferred. This wish is then recorded in the data base BDP associated with the PAP module. It is also possible to associate with this wish a maximum period during which the subscriber actually wishes to receive telephone calls. A callable independent station will then be provided with means capable of signifying a refusal or agreement to receive telephone calls. Such an independent station will thus be able to effectively manifest its intention to receive calls.

The localization dialogue can then in this case be either the transmission of a localization signal from the independent handset to the fixed terminal BFR chosen by this handset or a telephone communication (incoming or outgoing) between this handset and a chosen terminal. The data base BDP is then capable of optionally storing the two types of localization data.

In practice, the data base BDP stores, in relation to the call number of the independent handset, the digital identification (for example, the address) over the digital channels of the terminal connection units URB, having effected the last localization from a localization signal transmitted by the handset, as well as a designation (for example, the number of the chosen fixed terminal BFR) of where this last localization has taken place. When this localization data derives from a telephone communication, the localization data is then also the digital address of the terminal connection unit, as well as the number of the fixed terminal whereon this last telephone communication has taken place.

As regards the localization data in particular, this data base BDP is kept up to date by the terminal connection units URB, thanks to the data coming from the center CAP or from the independent handsets.

Each data base BDP (here associated with a PAP module) has an address allowing it to be contacted on the digital channels CNPU. This information is stored in a list of subscribers which is placed at the disposal of the center CAP and is, moreover, provided with a cross reference between the call (dialing) number of an independent station and its identifying individual, as well as an information relating to the ability of this independent station to receive incoming calls (this ability depends in particular on the fact as to whether the subscriber is or is not up to date with his payments).

There will now follow a more general discussion of the setting up of the second telephone connection of the independent station with one of the second interfaces of the specific module PAP. This setting up is, as will be seen below, subject to the fulfillment of predetermined conditions.

In response to a call request from a fixed calling station SF on the switching telephone network CTPU, the processing means of the module PAP will establish a control link with the chosen fixed terminal. This control link comprises, after the corresponding data base BDP has been consulted, a digital connection between the module PAP and the terminal connection unit URB whose address corresponds to the localization data. More precisely, the establishment of this control link comprises the transmission of a digital signal from the specific module PAP to the chosen terminal BFR via its connecting unit URB. This digital signal comprises, apart from the identification of the terminal BFR, an order given by this terminal BFR, for a radio call to the independent station SA, as well as a telephone number of the specific module to be called up by this terminal BFR.

A first predetermined condition may, first of all, be a check of the effective capability of the chosen fixed terminal to cooperate with the handset. This check may, for example, include a check that this terminal is functioning properly or that it is capable of reaching the called independent handset.

Another predetermined condition may also be formed by the check that the subscriber is actually present and ready to accept the telephone call. Thus, provision may be made that this condition will only be met when the subscriber called has actually taken his handset off its rest.

Of course, other predetermined conditions may be envisaged.

On this basis, thanks to the call (dialing) number previously communicated, this chosen terminal BFR is capable of making its telephone call for establishing a telephone link with the second interface concerned of the module PAP.

It has been seen above that the specific module had, moreover, established a first telephone connection from the calling station SF to one of its first interfaces. It is now necessary to obtain the interconnection in order to allow the caller and the called party to communicate.

When the interconnection has effectively been obtained within the specific module, the second telephone connection from the independent station to the second interface is recorded as chargeable to the subscriber called, so as to invoice him accordingly. The first telephone connection of the calling station to the first interface is recorded as being chargeable to the latter with a view to being invoiced. In this connection, it should be observed that even if the subscriber of the independent station is not at his usual line location, the calling subscriber will only pay for a telephone communication from his place of call to the usual line location of the subscriber of the independent station.

If, for example, it is realized that one of the chosen localized terminals does not permit any radio communication with the independent handset, several solutions may be envisaged which, incidentally, do not constitute an exhaustive list.

One of them may lie in making provision for passing a digital signal to at least one other terminal taken from the adjacent terminal of the chosen localized terminal. This at least one digital signal sent to the at least one other terminal may, for example, come from the connecting unit controlling this group of terminals. This may prove to be particularly advantageous, particularly when the subscriber wishing to receive calls is situated in a receiving location sufficiently widespread to be covered by several fixed terminals. It is then quite possible for this subscriber to be located in relation to one of these terminals and then, following his travels over his reception area, to be no longer capable of communicating by radio with this chosen localized terminal, but with an adjacent terminal.

Another solution may lie in making a fresh attempt to set up a radio communication between the independent station and another chosen terminal whose localization data is also available in the data base. It may, for example, be the terminal where a prior telephone communication has taken place. This new attempt would then, for example, be effected by the processing means of the module PAP.

It should be observed that all these attempts may be made simultaneously or successively without any risk of conflicts because it is a single independent station that is concerned.

Figure 3:
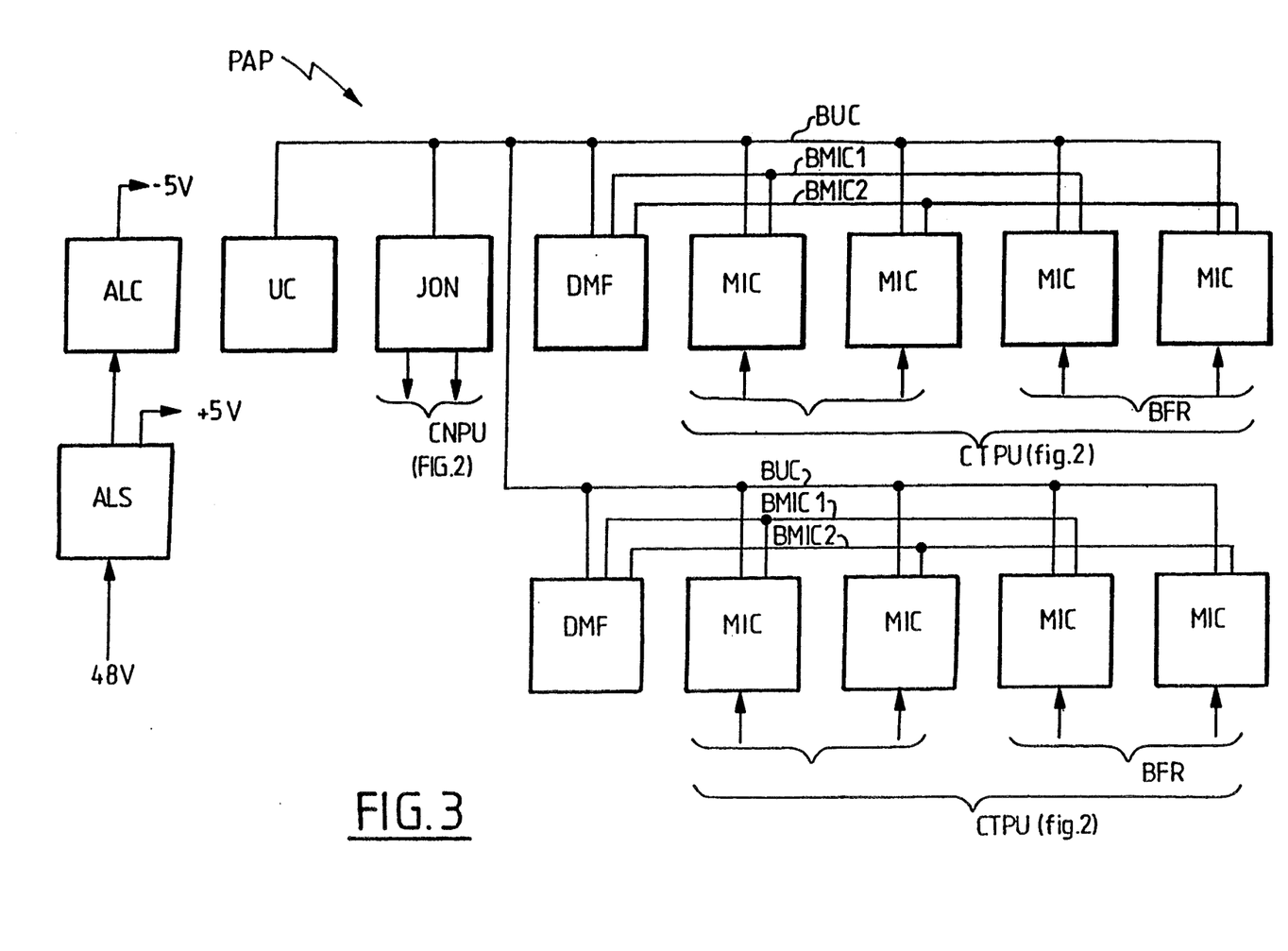
FIG. 3 represents a block diagram of an embodiment of a device in accordance with the invention, intended more particularly to be connected to a public switching network.

An equipment block diagram of a specific module PAP is illustrated in FIG. 3. Such a module allows 120 incoming calls to be received simultaneously, which may be suitable for approximately 10,000 POINTEL subscribers.

This PAP module comprises power supply means ALS and ALC capable of supplying voltages of + and −5 volts from a voltage of 48 volts supplied by the switching telephone network CTPU.

The first and second telephone interfaces here comprise cards MIC for digitizing the analogue telephone signals being passed over the telephone channels. These cards are, for example, those sold by the French Company AETA under reference ES 0290.

The interconnection means are provided by two buses BMIC1 and BMIC2 for the digital connection between the various cards MIC of the first and second interfaces.

Each bus BMIC has a capacity of 2 megabytes/s.

Provision is also made for digital interface means JON with the digital communication channels. These interface means here comprise, for example, a card such as that sold by the MOTOROLA Company under reference MVME 333. They allow a digital interface to be obtained in accordance with the international standard CCITT X25.

The processing means UC are connected to the cards JON and MIC by a bus BUC. As for the equipment, they may take the form of the card sold by the MOTOROLA Company under reference MVME 117A based on the MOTOROLA processor 68010. With this processor, there is associated a dynamic read/write memory of 2 megaoctets, wherein the data base BDP is incorporated which contains the localization data.

Figure 4:
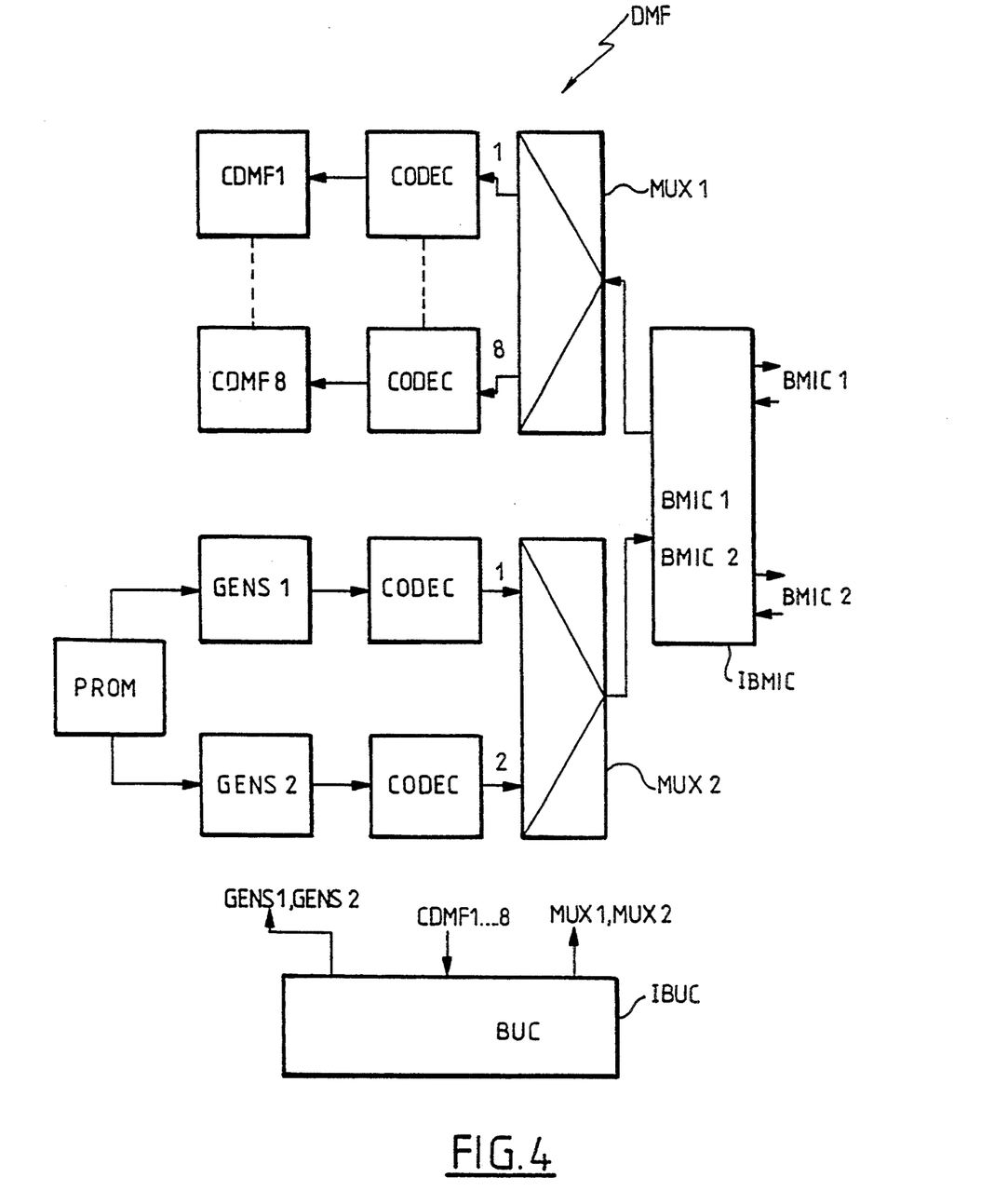
FIG. 4 represents a block diagram of part of the device of FIG. 3.

A card DMF is also incorporated in the module PAP. Its block diagram is illustrated in FIG. 4.

This card is connected to the buses BMIC1 and BMIC2 by interface means IBMIC connected to the input of a multiplexer MUX1 and to the output of another multiplexer MUX2. The eight outputs of the multiplexer MUX1 are respectively connected to eight analogue/digital converters CODEC followed by eight decoders CDMF1–CDMF8 capable of decoding the call number of the corresponding subscriber coded according to the international standard CCITT Q23. Each CODEC component is, for example, sold by the SGS-THOMSON Company under reference ETC 5067. Each decoder CDMF is, for example, that sold by the British Company PLESSEY under reference MV 8870 DP.

This card DMF moreover allows recorded hold messages to be transmitted to the calling users. For this purpose, provision is made for two voice synthesizers GENS1, GENS2 associated with a PROM programmable read-only memory. The structure of each synthesizer GENS is based on a signal processor such as the one sold by the US Company TEXAS INSTRUMENTS under reference TMS 50C20. These two synthesizers are connected to the two inputs of the multiplexers MUX2 via two converters CODEC.

Finally, provision is made for interface means IBUC between these various components and the BUS BUC.

The setting up of an incoming call from a subscriber of a private communications network is similar to that described for the public communications network. The specific module PAL is then associated with a data base BDL similar to that of the data base BDP.

Figure 5:
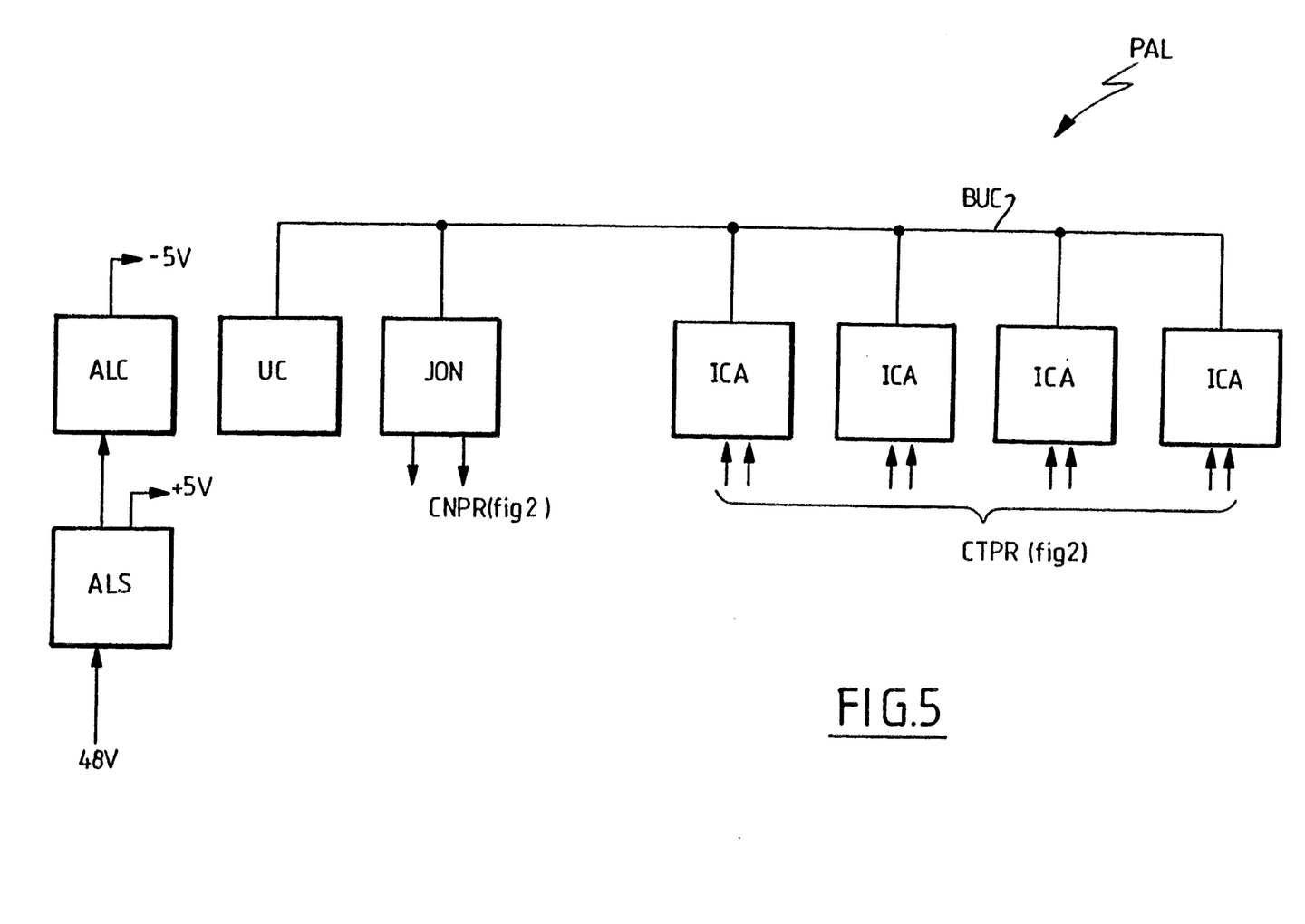
FIG. 5 represents a block diagram of an embodiment of the device in accordance with the invention, intended more particularly to be connected to a private switching network and, FIG. 6 represents a block diagram of a part of the device of FIG. 5.

The equipment structure of such a specific module PAL is schematically illustrated in FIG. 5.

Figure 6:
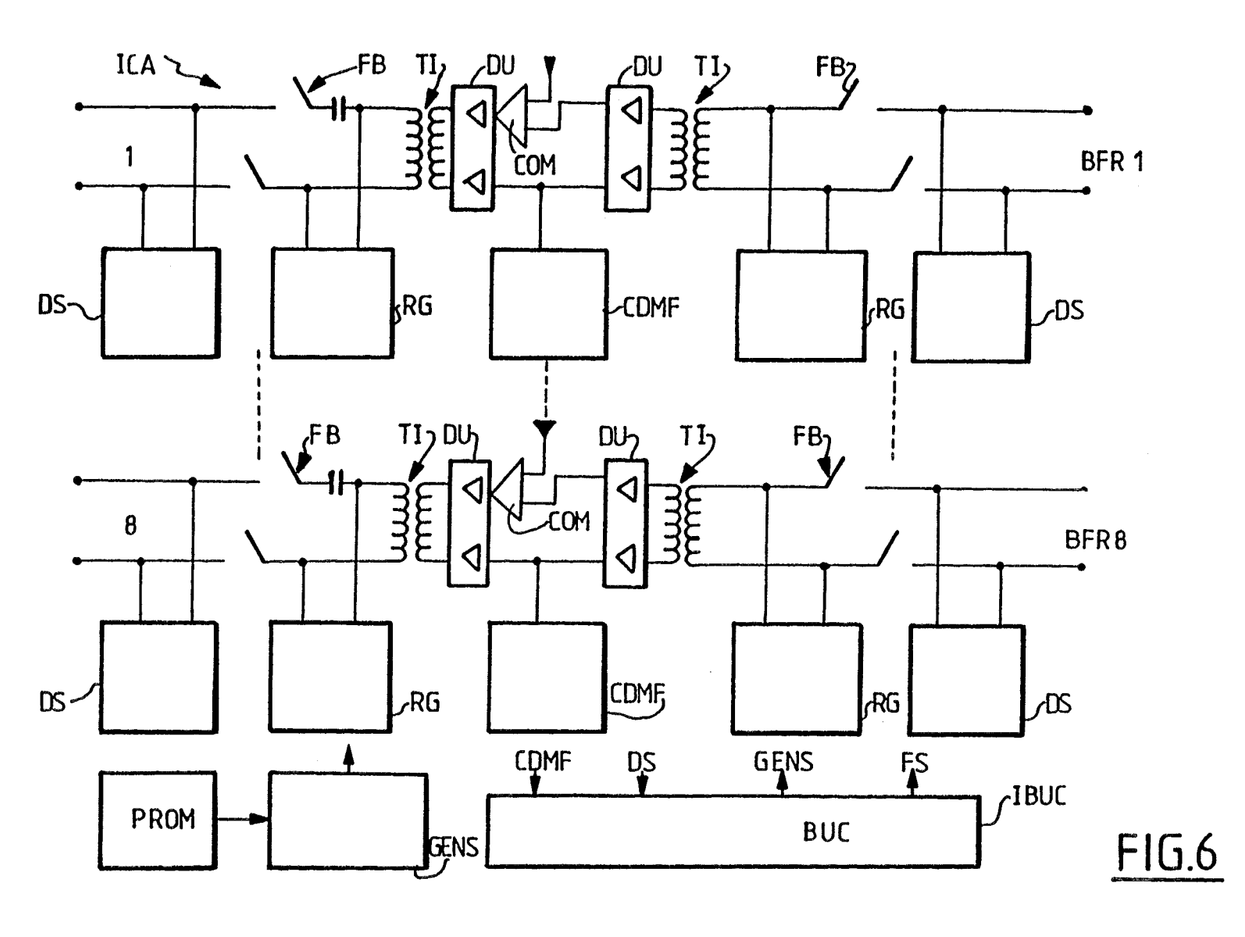

In such a specific module with an analog connection, the cards MIC and DMF of the module PAP are replaced by interface cards of the subscriber circuits ICA, a block diagram of one of them being illustrated in FIG. 6. These cards ensure the connection of the incoming calls and of the calls coming from the fixed terminals BFR. One card ICA brings together eight subscriber circuits and therefore allows eight incoming calls to be set up simultaneously.

The call (dialing) number of the desired POINTEL subscriber is coded according to the international standard CCITT Q23 as in the case of the module PAP. The card ICA comprises in essence the following elements:
as regards the first and second interfaces:
a ringing detector circuit DS followed by a loop closing/opening circuit FB (a relay), then by a current regulator circuit RG, by an insulating transformer DI, and by a duplexer DU.

As regards the first interfaces, that is to say those relating to the connection with the caller:
a decoder circuit CDMF, connected to the two duplexers DU and
a switch COM for a voice synthesizer input.

In this connection, there is also provided the voice synthesizer GENS associated with the programmable read only memory PROM for prerecorded messages.

Finally, provision is made for an interface IBUC with the bus BUC of the card ICA connected to the processing means UC and to the card JON.

The invention is not limited to the embodiments described above, but comprises all the variants contained within the scope of the claims set out below. In particular, the following variations are contemplated:
the structure described above with regard to the module PAP would also be suitable for a connection of the latter to a private communications network. Similarly, the module PAL could also be connected to a public communications network.
Means have been described forming distributed data bases associated with each specific module PAP or PAL. It could also be envisaged for these means forming the data bases to be centralized and then be connected to the POINTEL authorization center CAP, as represented in dashes under reference BDPC in FIG. 2.
It is also possible to design a centralized module PAP which could, for example, be incorporated in the center CAP.

Telephone calls coming from an independent station calling a callable independent station could, of course, be envisaged. In this case, the fixed terminal cooperating with the calling independent station performs the function of the fixed calling station SF described above.

More generally, an independent station is not limited to a telephone handset, but concerns any object capable of cooperating with a fixed terminal.

Of course, some of the means described above may be omitted in the variants where they fulfill no purpose.

I claim:

1. In a telephone device for a communications network between fixed stations, with fixed terminals for communicating with independent stations in response to call requests for the latter, the communications network including a digital communications medium, the improvement wherein the telephone device has at least one specific module comprising:
   (a) first and second telephone interfaces respectively connected to telephone channels of the network;
   (b) means for interconnecting said first and second telephone interfaces;
   (c) digital interface means connected to the digital communications medium for exchanging digital information; and
   (d) processing means responsive to a request for a telephone call from a calling station to a call (dialing) number assigned to a callable independent station, the processing means having means for storing information associated therewith, the call request being received at one of the first telephone interfaces:
      (i) for establishing, in addition to a first telephone connection from the calling station to the first telephone interface, a second telephone connection from the callable independent station to one of the second telephone interfaces in accordance with predetermined conditions stored in the means for storing information, and establishing a telephone link between the second telephone interface concerned and a chosen fixed terminal for communicating with the callable independent station, the telephone link being produced by a telephone call from the chosen terminal to the specific module, and
      (ii) for obtaining the interconnection of the first and second telephone interfaces concerned, said processing means comprising means for establishing a bidirectional digital link for exchanging digital information in the digital communications medium between said digital interface means and said chosen terminals, at least before said telephone link has been established in the telephone channels, for establishing and operating the second telephone connection based on the predetermined conditions stored in the means for storing.

2. A device according to claim 1, wherein said predetermined conditions comprise a check of the effective capability of the chosen terminal to cooperate with the independent station.

3. A device according to claim 1 or 2, wherein said callable station comprises means for signifying a refusal or agreement to receive telephone calls.

4. A device according to claim 1, wherein said predetermined conditions comprise a check that a subscriber of the independent station is actually present and ready to accept the telephone call.

5. A device according to claim 1, wherein the telephone call to the specific module is produced by the chosen terminal in response to satisfaction of the predetermined conditions.

6. A device according to claim 1, wherein in the case where the predetermined conditions are not met with regard to said chosen terminal, the device is capable of trying to establish the telephone link with at least one other terminal taken from the terminal adjacent to said chosen terminal.

7. A device according to claim 1, wherein said establishing of the digital link comprises the transmission of a digital signal from said specific module to said chosen terminal.

8. A device according to claim 1, further comprising means forming data bases connected to the specific module and capable of storing data for localizing said chosen terminal in accordance with said call (dialing) number of the independent station for enabling said telephone link to be established.

9. A device according to claim 8, wherein said localization data derives from a localization dialog between said callable independent station and said chosen terminal.

10. A device according to claim 9, wherein said localization dialog comprises the transmission of a localization signal from said callable independent station to said chosen terminal.

11. A device according to claim 9, wherein said localization dialog comprises a telephone communication between said independent station and said chosen terminal.

12. A device according to claim 1, wherein the means forming the data bases store two localization data of different types.

13. A device according to claim 1, further comprising means forming data bases connected to the specific module for storing data for localizing said chosen terminal in accordance with said call (dialing) number of the independent station, for enabling said telephone link to be established, and wherein said localization data is a digital type of information for enabling said digital connection to be set up.

14. A device according to claim 13, comprising connection units for the connection of fixed terminals, each said connection unit being connected on the one hand to a group of said fixed terminals and, on the other hand, at least to said digital communications medium of the network, and wherein said localization data comprises the digital identification of the connection unit connected to said chosen terminal, as well as the designation of said chosen terminal within the group of terminals controlled by that connection unit.

15. A device according to claim 1, wherein the call (dialing) number of the independent station is associated with its usual line location, and the device comprises a plurality of specific modules assigned respectively to a plurality of adjacent line locations.

16. A device according to claim 15, further comprising means forming data bases connected to the specific module and capable of storing data for localizing said chosen terminal in accordance with said call (dialing) number of the independent station, for enabling said telephone link to be established, and wherein said means forming the data bases are distributed into bases of local data associated with each specific module and having at their disposal data for localizing the chosen terminals in relation to their usual independent stations.

17. A device according to claim 15, further comprising means forming data bases connected to the specific module and capable of storing data for localizing said chosen terminal in accordance with said call (dialing) number of the independent station, allowing said telephone link to be established, and wherein said means forming the data bases are centralized, and each said specific module has access to these means forming the data base.

18. A device according to claim 14, wherein, said localization data in the means forming data bases is updated by the terminal connection units.

19. A device according to claim 1, wherein said first and second telephone interfaces of the specific module are capable of being connected to a public communications network.

20. A device according to claim 1, wherein said first and second telephone interfaces of the specific module are capable of being connected to a private communications network.

21. A device according to claim 19, wherein said first and second telephone interfaces comprise a plurality of cards for digitizing the telephone signals connected by at least one connecting bus forming the interconnection means, and wherein provision is made for means capable of decoding the call (dialing) number of the called station, as well as of transmitting prerecorded vocal hold messages.

22. A device according to claim 19, wherein
(i) each said first and second telephone interface comprises a ringing detector circuit followed by a loop closing/opening circuit, then by a current regulator circuit, by an insulating transformer and by a duplexer, and wherein
(ii) each first telephone interface comprises a circuit for decoding the called number, as well as a switch for a vocal synthesizer input.

23. A device according to claim 1, wherein said first telephone connection is recorded as chargeable to the calling subscriber, and said second telephone connection as chargeable to the called subscriber.

24. In a method for telephone connections for serving in a communications network between fixed stations and fixed terminals for communicating with independent stations in response to call requests for the latter, the communications network being provided with a digital communications medium, including at least one specific module
  having first and second telephone interfaces respectively connected to telephone channels of the network;
  interconnection means for interconnecting between said first and second telephone interfaces;
  digital interface means connected to the digital communications medium for exchanging digital information; and
  a processor, the method comprising the steps of: (a) responding to a request for a telephone call from a fixed calling station to a call (dialing) number assigned to a callable independent station, by connecting said call request to one of said first telephone interfaces by a first telephone connection and communicating said call request to said processor,
  (b) in response to said first telephone connection, using the processor to attempt to establish, in addition to the first telephone connection from the calling station to said first telephone interface, a second telephone connection from the independent station to one of its second telephone interfaces in accordance with predetermined conditions stored in a storage device associated with the processor, this attempt to establish the second telephone connection comprising a step of establishing a telephone link between the second telephone interface concerned and a chosen fixed terminal for communicating with the callable independent station, wherein there is a step of producing said telephone link by a telephone call from the chosen terminal to said specific module, and (c) attempting, in further response to said first telephone connection, to obtain the interconnection of said first and second telephone interfaces concerned by using said processor for establishing a bidirectional digital link for exchanging digital information in the digital communications medium between said digital interface means and said chosen terminal, at least before said telephone link has been established in the telephone channels, for establishing and managing the second telephone connection in accordance with the predetermined conditions stored in the storage means.

* * * * *